United States Patent
Ricci et al.

(10) Patent No.: US 8,893,714 B2
(45) Date of Patent: Nov. 25, 2014

(54) EXPANSION JOINTS FOR PANELS IN SOLAR BOILERS

(75) Inventors: Russell Ricci, Brookfield, MA (US);
John Persson, Worcester, MA (US);
Andrew Plotkin, Worcester, MA (US);
Kevin Toupin, Princeton, MA (US)

(73) Assignee: Babcock Power Services, Inc., Worcester, MA (US)

( * ) Notice: Subject to any disclaimer, the term of this patent is extended or adjusted under 35 U.S.C. 154(b) by 1299 days.

(21) Appl. No.: 12/701,999

(22) Filed: Feb. 8, 2010

(65) Prior Publication Data

US 2010/0199980 A1 Aug. 12, 2010

Related U.S. Application Data

(60) Provisional application No. 61/151,984, filed on Feb. 12, 2009, provisional application No. 61/152,011, filed on Feb. 12, 2009, provisional application No. 61/152,035, filed on Feb. 12, 2009, provisional application No. 61/152,049, filed on Feb. 12, 2009, provisional application No. 61/152,077, filed on Feb. 12, 2009, provisional application No. 61/152,114, filed on Feb. 12, 2009, provisional application No. 61/152,286, filed on Feb. 13, 2009.

(51) Int. Cl.
*F24J 2/46* (2006.01)
*F24J 2/07* (2006.01)
*F24J 2/24* (2006.01)

(52) U.S. Cl.
CPC .. *F24J 2/07* (2013.01); *F24J 2/245* (2013.01); *Y02E 10/41* (2013.01); *Y02E 10/44* (2013.01)
USPC .......................................................... 126/704

(58) Field of Classification Search
CPC ................... Y02E 10/41; F24J 2/245
USPC ........ 126/626, 627, 635, 651, 655, 658, 659, 126/661, 663, 680, 634, 689, 573, 704; 122/235.11, 235.14, 460, 235.12; 136/244; 165/272, 104.22, 81, 82
See application file for complete search history.

(56) References Cited

U.S. PATENT DOCUMENTS

| 2,383,234 | A | | 8/1945 | Barnes | |
| 3,163,265 | A | * | 12/1964 | Waite | 52/471 |

(Continued)

FOREIGN PATENT DOCUMENTS

| FR | 2501839 A1 | 9/1982 |
| JP | 53131309 A | 11/1978 |

(Continued)

OTHER PUBLICATIONS

U.S. Appl. No. 60/943,096, Kroizer.

(Continued)

*Primary Examiner* — Avinash Savani
*Assistant Examiner* — Vivek Shirsat
(74) *Attorney, Agent, or Firm* — Edwards Wildman Palmer LLP; Joshua L. Jones; Alicia J. Esposito

(57) ABSTRACT

A boiler for a solar receiver includes a first receiver panel having a plurality of substantially parallel boiler tubes fluidly connecting an inlet header of the panel to an outlet header of the panel. A second receiver panel has a plurality of substantially parallel boiler tubes fluidly connecting an inlet header of the panel to an outlet header of the panel. The boiler tubes of the second receiver panel are substantially parallel to the boiler tubes of the first receiver panel. The first and second receiver panels are separated by a gap. A panel expansion joint is connected to the first and second receiver panels across the gap, wherein the panel expansion joint is configured and adapted to allow for lengthwise thermal expansion and contraction of the receiver panels along the boiler tubes, and to allow for lateral thermal expansion and contraction of the receiver panels toward and away from one another, while blocking solar radiation through the gap.

10 Claims, 9 Drawing Sheets

(56) References Cited

U.S. PATENT DOCUMENTS

| | | | |
|---|---|---|---|
| 3,197,343 A | 7/1965 | Palmatier | |
| 3,208,877 A | 9/1965 | Merry | |
| 3,325,312 A | 6/1967 | Sonntag, Jr. | |
| 3,450,192 A | 6/1969 | Hay | |
| 3,459,597 A | 8/1969 | Baron | |
| 3,464,402 A | 9/1969 | Collura | |
| 3,814,530 A * | 6/1974 | Neff | 404/67 |
| 3,822,692 A | 7/1974 | Demarest | |
| 3,823,703 A | 7/1974 | Lanciault | |
| 3,893,506 A | 7/1975 | Laing | |
| 3,924,604 A | 12/1975 | Anderson | |
| 3,927,659 A | 12/1975 | Blake et al. | |
| 3,951,108 A | 4/1976 | Rees | |
| 3,968,652 A | 7/1976 | Chevalier | |
| 3,991,742 A | 11/1976 | Gerber | |
| 3,995,804 A | 12/1976 | Folds et al. | |
| 4,003,366 A | 1/1977 | Lightfoot | |
| 4,037,639 A | 7/1977 | Jones | |
| 4,088,266 A | 5/1978 | Keyes | |
| 4,094,147 A | 6/1978 | Alleau et al. | |
| 4,112,921 A | 9/1978 | MacCracken | |
| 4,120,288 A | 10/1978 | Barrett | |
| 4,127,102 A | 11/1978 | Berman | |
| 4,127,103 A | 11/1978 | Klank et al. | |
| 4,128,096 A | 12/1978 | Katz | |
| 4,136,674 A | 1/1979 | Korr | |
| 4,191,246 A | 3/1980 | Cassell | |
| 4,204,523 A | 5/1980 | Rothe | |
| 4,205,658 A | 6/1980 | Clark | |
| 4,210,122 A | 7/1980 | Artweger | |
| 4,215,676 A | 8/1980 | Gilliam | |
| 4,237,861 A | 12/1980 | Fayard et al. | |
| 4,245,618 A | 1/1981 | Wiener | |
| 4,253,801 A | 3/1981 | O'Hare | |
| 4,257,477 A | 3/1981 | Maloney | |
| 4,261,330 A | 4/1981 | Reinisch | |
| 4,265,223 A | 5/1981 | Miserlis et al. | |
| 4,269,172 A | 5/1981 | Parker et al. | |
| 4,273,100 A | 6/1981 | Cogliano | |
| 4,280,483 A | 7/1981 | Schaffer | |
| 4,289,114 A | 9/1981 | Zadiraka | |
| 4,296,730 A | 10/1981 | Zadiraka | |
| 4,296,733 A | 10/1981 | Saunders | |
| 4,312,687 A | 1/1982 | Sigworth, Jr. | |
| 4,313,304 A | 2/1982 | Hunt | |
| 4,320,663 A | 3/1982 | Francia | |
| 4,324,229 A | 4/1982 | Risser | |
| 4,338,991 A | 7/1982 | Sigworth, Jr. | |
| 4,350,374 A | 9/1982 | Brollo | |
| 4,353,356 A | 10/1982 | Vandenbossche | |
| 4,359,043 A | 11/1982 | Dominique et al. | |
| 4,367,726 A | 1/1983 | Maes, Jr. | |
| 4,371,035 A | 2/1983 | Soligno | |
| 4,373,512 A | 2/1983 | Hirt | |
| 4,380,996 A | 4/1983 | Mengeringhausen | |
| 4,384,550 A | 5/1983 | Miller | |
| 4,394,859 A | 7/1983 | Drost | |
| 4,404,960 A | 9/1983 | Laing | |
| 4,416,265 A | 11/1983 | Wallace | |
| 4,428,361 A | 1/1984 | Straza | |
| 4,432,341 A | 2/1984 | Howe et al. | |
| 4,454,863 A | 6/1984 | Brown et al. | |
| 4,485,803 A * | 12/1984 | Wiener | 126/591 |
| 4,503,903 A | 3/1985 | Kramer | |
| 4,512,336 A | 4/1985 | Wiener | |
| 4,535,755 A | 8/1985 | Roberts | |
| 4,569,331 A | 2/1986 | Tani et al. | |
| 4,615,381 A | 10/1986 | Maloney | |
| 4,653,470 A | 3/1987 | Carli et al. | |
| 4,660,630 A | 4/1987 | Cunningham et al. | |
| 4,665,894 A | 5/1987 | Juhasz | |
| 4,712,338 A | 12/1987 | Trickel | |
| 4,721,069 A * | 1/1988 | Kreider | 122/511 |
| 4,768,345 A | 9/1988 | Kardas | |
| 4,832,119 A | 5/1989 | Bloor et al. | |
| 4,867,133 A | 9/1989 | Sadler | |
| 4,946,512 A | 8/1990 | Fukuroi et al. | |
| 4,972,806 A | 11/1990 | Marsault | |
| 5,163,821 A | 11/1992 | Kelly et al. | |
| 5,174,128 A | 12/1992 | Bourne et al. | |
| 5,201,282 A | 4/1993 | Albrecht | |
| 5,217,000 A | 6/1993 | Pierce-Bjorklund | |
| 5,342,016 A | 8/1994 | Marsault et al. | |
| 5,368,092 A | 11/1994 | Rearden et al. | |
| 5,404,937 A | 4/1995 | Assaf et al. | |
| 5,417,052 A | 5/1995 | Bharathan et al. | |
| 5,444,972 A | 8/1995 | Moore | |
| 5,482,233 A | 1/1996 | Marko et al. | |
| 5,694,774 A | 12/1997 | Drucker | |
| 5,727,379 A | 3/1998 | Cohn | |
| 5,823,176 A | 10/1998 | Harris | |
| 5,850,831 A | 12/1998 | Marko | |
| 5,857,322 A | 1/1999 | Cohn | |
| 5,862,800 A | 1/1999 | Marko | |
| 5,881,456 A | 3/1999 | Bergins et al. | |
| 5,943,985 A | 8/1999 | Hartman | |
| 6,126,120 A | 10/2000 | Quaranta et al. | |
| 6,155,339 A | 12/2000 | Grapengater | |
| 6,173,927 B1 | 1/2001 | Delsol | |
| 6,240,156 B1 | 5/2001 | Matsumoto et al. | |
| 6,301,928 B1 | 10/2001 | Tanatsugu et al. | |
| 6,434,942 B1 | 8/2002 | Charlton | |
| 6,487,859 B2 | 12/2002 | Mehos et al. | |
| 6,497,102 B2 | 12/2002 | Liebig | |
| 6,532,953 B1 | 3/2003 | Blackmon et al. | |
| 6,668,555 B1 | 12/2003 | Moriarty | |
| 6,708,687 B2 | 3/2004 | Blackmon, Jr. et al. | |
| 6,736,134 B2 | 5/2004 | Marko | |
| 6,913,015 B2 | 7/2005 | Pajk | |
| 6,926,440 B2 | 8/2005 | Litwin | |
| 6,931,851 B2 | 8/2005 | Litwin | |
| 7,011,086 B2 | 3/2006 | Litwin | |
| 7,600,350 B2 | 10/2009 | Braunstein | |
| 7,640,746 B2 | 1/2010 | Skowronski et al. | |
| 7,806,377 B2 | 10/2010 | Strizki | |
| 2001/0010222 A1 | 8/2001 | Prueitt | |
| 2002/0029869 A1 | 3/2002 | Kodumudi et al. | |
| 2003/0041856 A1 | 3/2003 | Blackmon et al. | |
| 2004/0035111 A1 | 2/2004 | Ven et al. | |
| 2004/0112374 A1 | 6/2004 | Litwin | |
| 2004/0139961 A1 | 7/2004 | Blackmon et al. | |
| 2004/0244376 A1 | 12/2004 | Litwin et al. | |
| 2004/0251002 A1 | 12/2004 | Reichle et al. | |
| 2004/0255571 A1 | 12/2004 | Fetescu et al. | |
| 2004/0256000 A1 * | 12/2004 | Konstantin | 136/251 |
| 2005/0016524 A1 | 1/2005 | Broatch | |
| 2006/0225863 A1 | 10/2006 | Levin | |
| 2006/0260314 A1 | 11/2006 | Kincaid et al. | |
| 2007/0089775 A1 | 4/2007 | Lasich | |
| 2007/0119718 A1 | 5/2007 | Gibson et al. | |
| 2007/0227531 A1 | 10/2007 | Garcia Cors et al. | |
| 2007/0295382 A1 | 12/2007 | Oak | |
| 2008/0000231 A1 | 1/2008 | Litwin et al. | |
| 2008/0022685 A1 | 1/2008 | Zhu | |
| 2008/0053523 A1 * | 3/2008 | Brown et al. | 136/256 |
| 2008/0078378 A1 | 4/2008 | Zhu | |
| 2008/0092551 A1 | 4/2008 | Skowronski | |
| 2008/0256953 A1 | 10/2008 | Arkas et al. | |
| 2008/0302357 A1 | 12/2008 | DeNault | |
| 2009/0014057 A1 | 1/2009 | Croft et al. | |
| 2009/0101134 A1 | 4/2009 | Merrett | |
| 2009/0107146 A1 | 4/2009 | Lin | |
| 2009/0114269 A1 | 5/2009 | Fletcher et al. | |
| 2009/0114270 A1 | 5/2009 | Stancel | |
| 2009/0199557 A1 | 8/2009 | Bennett | |
| 2009/0250051 A1 | 10/2009 | Lata Perez | |
| 2009/0260359 A1 | 10/2009 | Palkes | |
| 2009/0276993 A1 | 11/2009 | Fedock et al. | |

(56) References Cited

U.S. PATENT DOCUMENTS

2010/0229853 A1 9/2010 Vandal et al.
2010/0236183 A1 9/2010 Cusson et al.

FOREIGN PATENT DOCUMENTS

JP 08326223 A 12/1996
WO WO-2008154599 A1 12/2008

OTHER PUBLICATIONS

International Search Report and Written Opinion, dated Aug. 30, 2010 for PCT/US2010/023124.
International Search Report and Written Opinion, dated Aug. 31, 2010 for PCT/US2010/023165.
International Search Report and Written Opinion, dated Oct. 13, 2010 for PCT/US2010/023622.
International Search Report and Written Opinion, dated Oct. 13, 2010 for PCT/US2010/023826.
International Search Report and Written Opinion, dated Dec. 13, 2010 for PCT/US2010/023367.
International Search Report and Written Opinion, dated Dec. 13, 2010 for PCT/US2010/023500.
Official Action issued by the Israel Patent Office dated Mar. 25, 2014 for Israel Patent Application No. 214524.

* cited by examiner

EXPANSION JOINTS FOR PANELS IN SOLAR BOILERS

CROSS-REFERENCE TO RELATED APPLICATIONS

This application claims priority to U.S. Provisional Application No. 61/151,984, filed Feb. 12, 2009, to U.S. Provisional Application No. 61/152,011, filed Feb. 12, 2009, to U.S. Provisional Application No. 61/152,035, filed Feb. 12, 2009, to U.S. Provisional Application No. 61/152,049, filed Feb. 12, 2009, to U.S. Provisional Application No. 61/152,077, filed Feb. 12, 2009, to U.S. Provisional Application No. 61/152,114, filed Feb. 12, 2009, and to U.S. Provisional Application No. 61/152,286, filed Feb. 13, 2009, each of which is incorporated by reference herein in its entirety.

BACKGROUND OF THE INVENTION

1. Field of the Invention

The present invention relates to solar power production, and more particularly, to solar receiver panels for use in solar boilers.

2. Description of Related Art

Solar power generation has been considered a viable source to help provide for energy needs in a time of increasing consciousness of the environmental aspects of power production. Solar energy production relies mainly on the ability to collect and convert energy freely available from the sun and can be produced with very little impact on the environment. Solar power can be utilized without creating radioactive waste as in nuclear power production, and without producing pollutant emissions including greenhouse gases as in fossil fuel power production. Solar power production is independent of fluctuating fuel costs and does not consume non-renewable resources.

Solar power generators generally employ fields of controlled mirrors, called heliostats, to gather and concentrate sunlight on a receiver to provide a heat source for power production. A solar receiver typically takes the form of a panel of tubes conveying a working fluid therethrough. Previous solar generators have used working fluids such as molten salt because it has the ability to store energy, allowing power generation when there is no solar radiation. The heated working fluids are typically conveyed to a heat exchanger where they release heat into a second working fluid such as air, water, or steam. Power is generated by driving heated air or steam through a turbine that drives an electrical generator.

More recently, it has been determined that solar power production can be increased and simplified by using water/steam as the only working fluid in a receiver that is a boiler. This can eliminate the need for an inefficient heat exchanger between two different working fluids. This development has lead to new challenges in handling the intense solar heat without damage to the system. One such challenge involves the fact that traditional boilers are made up of multiple individual boiler panels sized to facilitate manufacture and maintenance. The intense heat fluxes in solar applications can be around 2-3 times higher than in typical fossil fuel boilers. Additionally, unlike fossil fuel boilers, solar boilers operate on a daily cycle, shutting down in the night. The high heat fluxes and frequency of operation cycles create challenges with respect to managing thermal expansion and contraction of the boiler panels. One such challenge is that panels expand vertically along their length as well as laterally across their width. If gaps are used between panels to allow for their thermal expansion, care must be exercised to protect structures and spaces behind the panels from solar radiation passing through the gaps, which is known as leakage. Also, gaps in the receiver area of a boiler constitute area where available sunlight from the heliostats is not captured.

While previously known systems of solar power production have generally been considered satisfactory for their intended purposes, there has remained a need in the art for solar receivers that can improve the accommodation of thermal expansion and protect the boiler from leakage of solar radiation. There also has remained a need in the art for such solar receivers that are easy to make and use. The present invention provides a solution to these problems.

SUMMARY OF THE INVENTION

The subject invention is directed to a new and useful boiler for a solar receiver. The boiler includes a first receiver panel having a plurality of substantially parallel boiler tubes fluidly connecting an inlet header of the panel to an outlet header of the panel. A second receiver panel has a plurality of substantially parallel boiler tubes fluidly connecting an inlet header of the panel to an outlet header of the panel. The boiler tubes of the second receiver panel are substantially parallel to the boiler tubes of the first receiver panel. The first and second receiver panels are separated by a gap. A panel expansion joint is connected to the first and second receiver panels across the gap, wherein the panel expansion joint is configured and adapted to allow for lengthwise thermal expansion and contraction of the receiver panels along the boiler tubes, and to allow for lateral thermal expansion and contraction of the receiver panels toward and away from one another, while blocking solar radiation through the gap.

In certain embodiments, the first and second receiver panels are substantially coplanar. It is also contemplated that the first an second receiver panels can be substantially perpendicular. The panel expansion joint can include a flexible panel expansion shield configured to block solar radiation through the gap and to flex to allow for lateral thermal expansion and contraction of the receiver panels toward and away from one another. The panel expansion shield can define elongated slots and can be attached to the first and second receiver panels by fasteners passing through the elongated slots to accommodate panel thermal expansion and compression along the slots.

The invention also includes a boiler for a solar receiver that includes T-bar assemblies. The boiler includes a first receiver panel having a plurality of substantially parallel boiler tubes fluidly connecting an inlet header of the panel to an outlet header of the panel. A second receiver panel has a plurality of substantially parallel boiler tubes fluidly connecting an inlet header of the panel to an outlet header of the panel. The boiler tubes of the second receiver panel are substantially parallel to the boiler tubes of the first receiver panel. The first and second receiver panels are separated by a gap. First and second T-bar assemblies are each attached to a backside of a respective one of said receiver panels. The T-bar assemblies are slidably connected by a connecting plate fixedly attached to one of the T-bar assemblies, and a fastener inserted through an elongated slot in said connecting plate and fixedly secured to the other one of the T-bar assemblies. An endmost tube of each of said panels is attached to an adjacent tube of the respective panel by a membrane at an angle such that adjacent endmost tubes are displaced from a plane defined by the tubes in each of the respective first and second receiver panels in opposite directions, such that solar radiation is prevented from passing through the gap and such that lateral thermal expansion and contraction of the receiver panels toward and away from one another is permitted by the slidable connector of the T-bar assemblies.

In accordance with certain embodiments, the panels form a corner with respect to one another, and each of the endmost tubes at the corner is rigidly connected by a membrane at about a 45° angle with respect to each of the receiver panels. Each of the T-bar assemblies can include upper and lower tube clips welded to every other boiler tube of each said panel. A first plate can be inserted into the upper and lower tube clips, the first plate running the width of each panel. A support plate can be inserted behind the first plate into the upper and lower tube clips, resting on the lower tube clip and running the width of each panel and having a space between the support plate and the upper tube clips to allow for thermal expansion. A T-bar can be welded to the support plate for each panel such that it is arranged substantially perpendicularly to the support plate. The connecting plate can slidably connect adjoining T-bars at the panel gap.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 11(a) is a partial cross-sectional view of a T-bar assembly and FIG. 11(b) is a top view of a T-bar assembly.

DETAILED DESCRIPTION OF THE PREFERRED EMBODIMENTS

Figure 1:
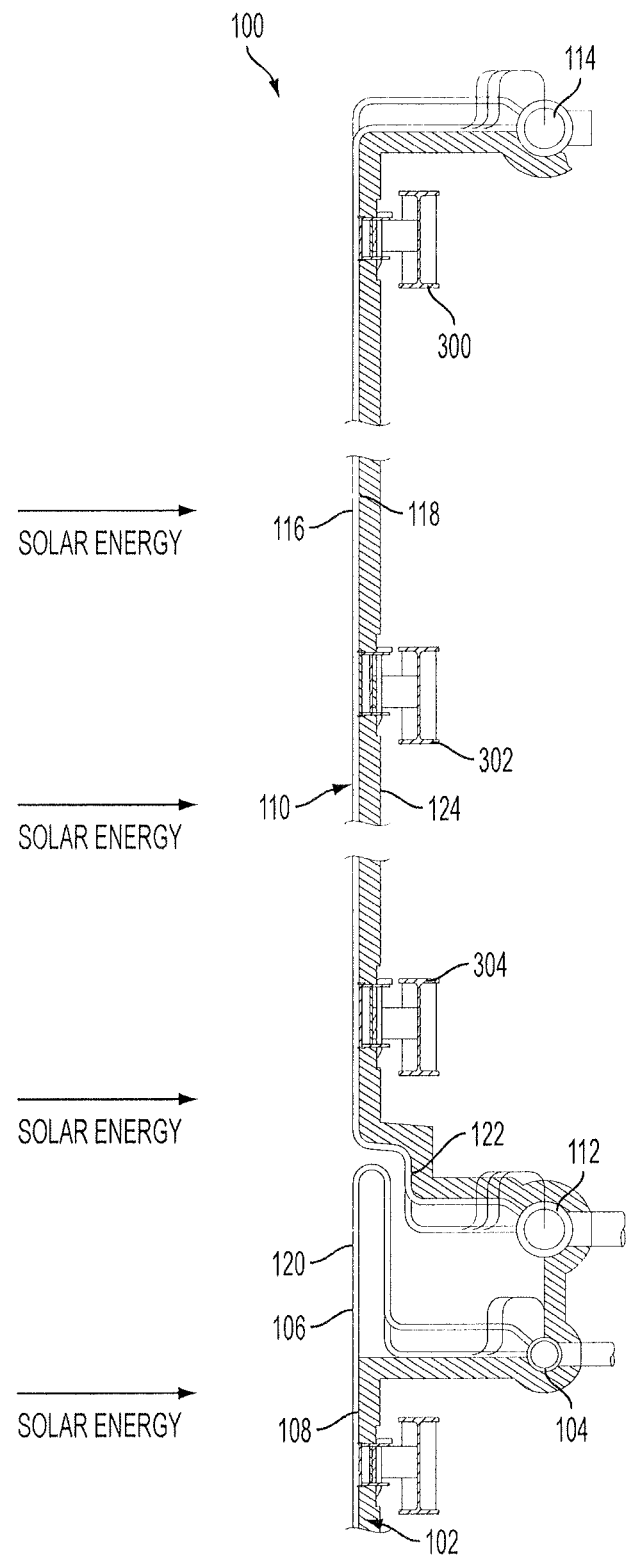
FIG. 1 is a side elevation view of a portion of a solar boiler constructed in accordance with the present invention, showing the receiver surface and the interior surface of the panel.

Reference will now be made to the drawings wherein like reference numerals identify similar structural features or aspects of the subject invention. For purposes of explanation and illustration, and not limitation, a partial view of a boiler in accordance with the invention is shown in FIG. 1 and is designated generally by reference character 100. Exemplary embodiments of a boiler in accordance with the invention, or aspects thereof, are provided in FIGS. 2-12, as will be described. The systems of the invention can be used to more effectively accommodate vertical and lateral thermal expansion in boiler panels while limiting leakage of solar radiation, for example in solar power generation.

A typical boiler is split into panels, which are sized to facilitate manufacturing, shipping, and assembly. Due to the unique heat flux in solar applications, specifically the large variations in heat flux experienced over small areas, each panel must be allowed to thermally expand and grow independently from the adjacent panels. Typically, there is a gap to allow for such thermal expansion, however, leaving a gap between panels allows concentrated solar radiation to penetrate into the boiler, i.e. leakage, exposing equipment inside. To prevent this, the system in accordance with the present invention is configured to reduce or eliminate radiation leakage, while still allowing for thermal expansion, both vertically and horizontally. The system consists of a panel expansion shield constructed of steel or any suitable material, which is fastened through slotted holes therethrough to the adjacent tubes across a gap between panels. The slotted hole allows for varying vertical expansion between panels. The shield itself is designed to flex inward as the panels grow toward each other. A panel expansion shield can also be configured to prevent radiation leakage at corner panels, where two panels meet perpendicular to each other. By using a panel expansion shield corner panels are allowed to grow in two dimensions, while maintaining a barrier to concentrated solar radiation.

With reference now to FIG. 1, boiler 100 for a solar receiver includes a first boiler panel 102, of a steam generator section for example, having a plurality of tubes fluidly connecting an inlet header of the first boiler (not shown, but see, e.g., 112) panel 102 to an outlet header 104 of the first boiler panel 102. The tubes of first boiler panel 102 form a first solar receiver surface 106 and a first internal surface 108 opposite first solar receiver surface 106. The exterior receiver surface 106 receives solar energy, for example from a field of heliostats, as indicated by arrows in FIG. 1.

A second boiler panel 110, of a superheater section, for example, similarly includes a plurality of tubes fluidly connecting an inlet header 112 of second boiler panel 110 to an outlet header 114 of second boiler panel 110. The tubes of second boiler panel 110 forming a second solar receiver surface 116 and a second internal surface 118 opposite the second solar receiver surface (i.e. external and internal surfaces, respectively, as indicated in FIG. 1). Like receiver surface 106, exterior receiver surface 116 receives solar energy, for example, from a field of heliostats, as indicated by arrows in FIG. 1.

Figure 2:
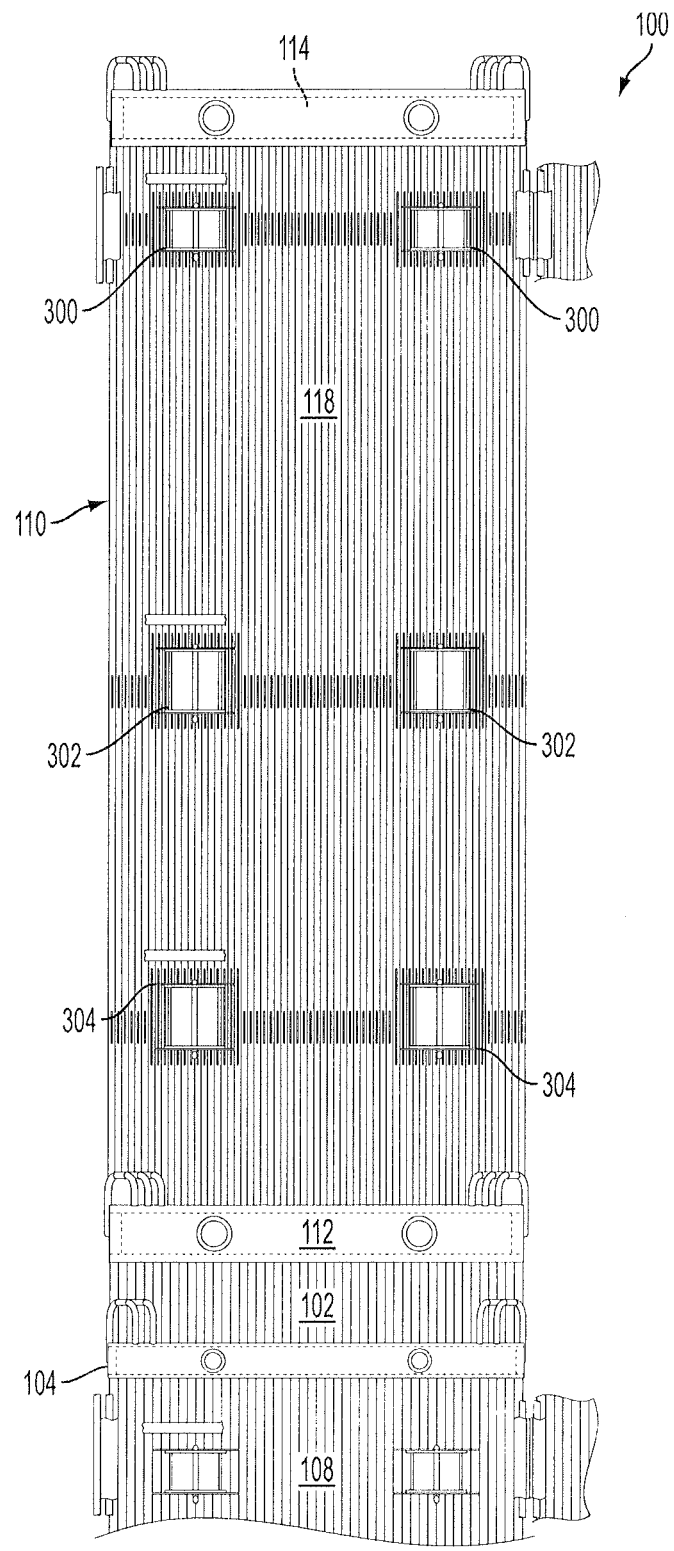
FIG. 2 is an interior elevation view of a portion of the solar boiler of FIG. 1, showing the tubing of the panels as well as the headers.

First and second boiler panels 102 and 110 are adjacent one another with an end 120 of first solar receiver surface 106 overlapping an end 122 of second boiler panel 110 to reduce solar radiation passing between the first and second solar receiver surfaces 106 and 116. The interior surfaces have a layer of insulating material 124 to protect the interior space and components from the high external temperatures. FIG. 2 shows the same portion of boiler 100 from the interior, with insulating material 124 removed to show the tubes and headers.

Figure 3:
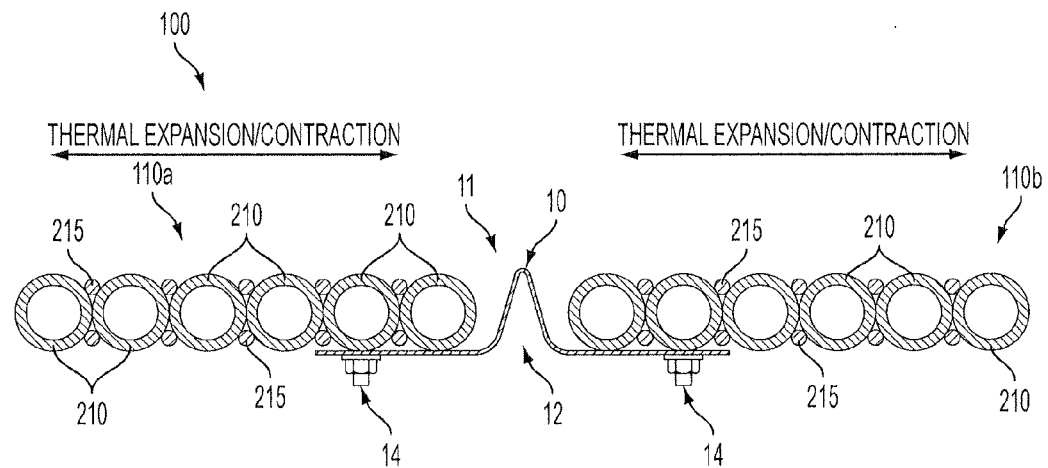
FIG. 3 is a cross-sectional view of a first exemplary embodiment of an expansion joint for solar boiler panels constructed in accordance with the present invention, showing the panel expansion shield spanning the gap between two adjacent boiler panels.

Referring now to a first exemplary embodiment as shown in FIG. 3, boiler 100 includes a first receiver panel 110a having a plurality of substantially parallel boiler tubes 210 fluidly connecting an inlet header of the panel 110a to an outlet header of the panel, as described above. A second receiver panel 110b has a plurality of substantially parallel boiler tubes 210 fluidly connecting an inlet header of the panel to an outlet header of the panel 110b, as described above. The boiler tubes 210 of second receiver panel 110b are substantially parallel to the boiler tubes 210 of first receiver panel 110a. The first and second receiver panels 110a,b are separated by a gap 11. A panel expansion shield 10 is connected to the first and second receiver panels 110a,b across gap 11.

Panel expansion shield includes a bend 12 which can flex to allow for lateral (width-wise) thermal expansion and contraction of the receiver panels toward and away from one another, as indicated by arrows in FIG. 3. Panel expansion shield 10 runs vertically along substantially the entire length of panels 110a,b to block solar radiation through gap 11.

Figure 4:
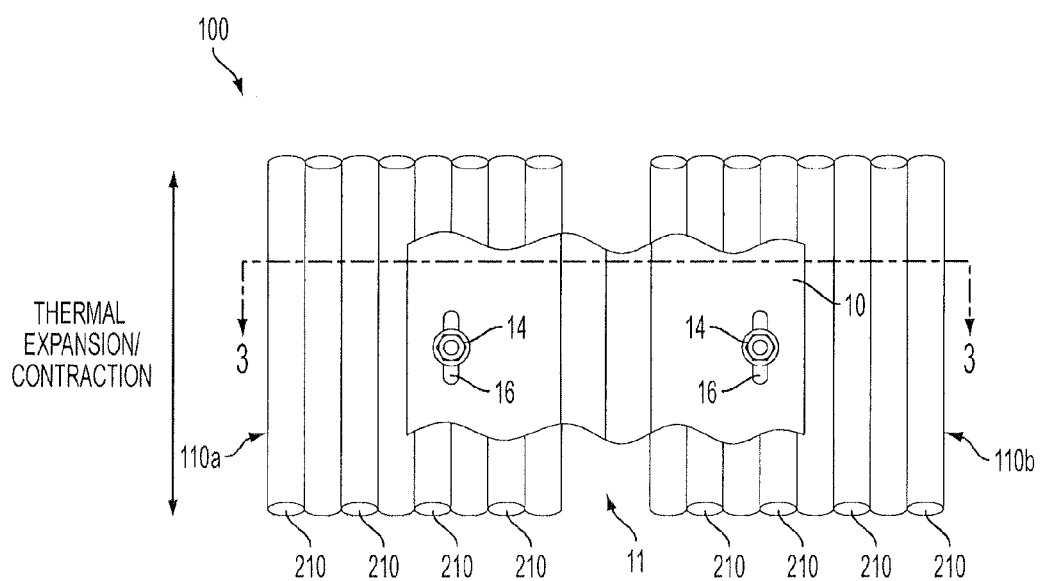
FIG. 4 is an interior elevation view of the expansion joint of FIG. 3, showing the slotted holes for attaching the panel expansion shield to the panels while accommodating for vertical thermal expansion and contraction of the panels.

Panel expansion shield 10 is also configured and adapted to allow for vertical thermal expansion and contraction of the receiver panels along the lengthwise direction boiler tubes 210, as indicated by arrows in FIG. 4. As shown in FIG. 4, panel expansion shield 10 has elongated slots 16 and is attached to first and second receiver panels 110a,b by fasteners 14 passing through elongated slots 16 to accommodate vertical thermal expansion of panels 110a,b and to allow for differences in thermal expansion.

Figure 5:
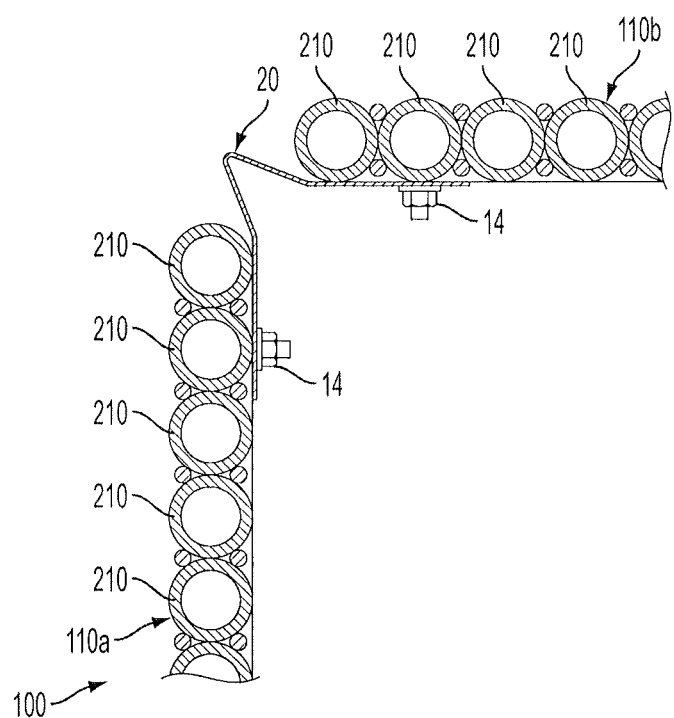
FIG. 5 is a cross-sectional view of a second exemplary embodiment of an expansion joint for solar boiler panels constructed in accordance with the present invention, showing how corner panels can be accommodated by a corner panel expansion shield.

In FIGS. 3-4, first and second receiver panels 110a,b are substantially coplanar with each other. As indicated in FIG. 5, in a second exemplary embodiment, it is also contemplated that first and second receiver panels 110a,b can be substantially perpendicular to one another, as at a corner of a solar boiler, for example. Panel expansion shield 20 is configured to prevent radiation leakage at the corners of the boiler. Panel expansion shield 20 consists of a single bent steel plate. Those skilled in the art will readily appreciate that any suitable material can be used without departing from the spirit and scope of the invention. Panel expansion shield 20 accommodates vertical movement of panels 110a,b in the same manner as panel expansion shield 10, that is, by vertical slot attachments for fasteners 14. While shown and described as accommodating a right angle, those skilled in the art will readily appreciate that panel expansion shields can be configured to accommodate any suitable angle without departing from the spirit and scope of the invention.

In order to withstand the high heat flux and shield internal components against leakage of solar radiation, panel expansion shields 10 and 20 are made of steel, ceramics, or any other suitable material. Rods 215 are used to attach tubes 210 together, as indicated in FIG. 3. This prevents leakage between tubes, provides support for the tubes, and allows for the tubes to flex as in thermal expansion and contraction. Rods 215 allow tubes 210 to be closer together (i.e., tangent), increasing the effective solar receiver area compared to panels with membranes between the tubes.

Figure 6:
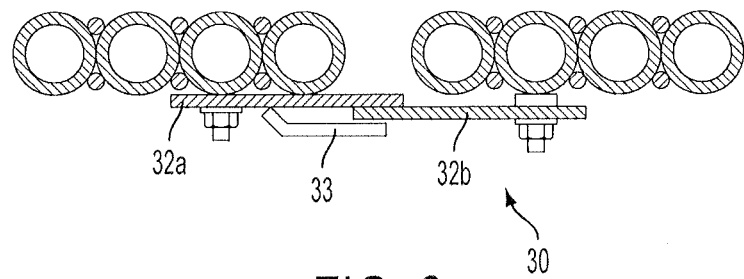
FIG. 6 is a cross-sectional view of a third exemplary embodiment of an expansion joint constructed in accordance with the present invention, showing two plates that can slide over one another to allow for lateral thermal expansion.
Figure 7:
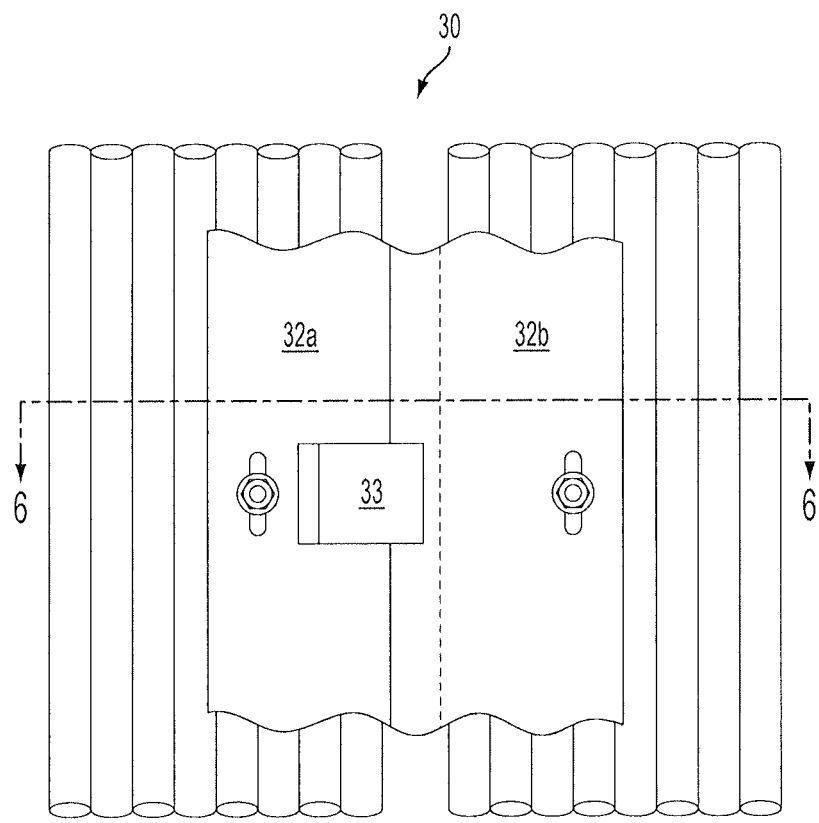
FIG. 7 is a interior elevation view of the expansion joint of FIG. 6, showing the alignment of the plates.

FIGS. 6-7 show a cross-sectional and interior elevation view, respectively, of another exemplary expansion shield 30 in accordance a third exemplary embodiment of the present invention. Expansion shield 30 includes a first plate 32a fastened to one panel and a second plate 32b fastened to an adjacent panel. Plate 32a includes an overlap plate 33. Plates 32a and 32b slide over one another to allow for lateral and vertical thermal expansion.

Figure 8:
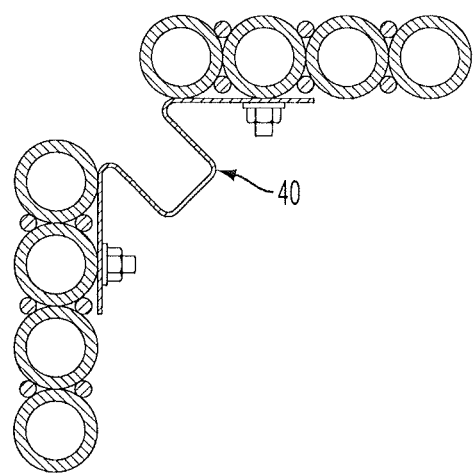
FIG. 8 is a cross-sectional view of a fourth exemplary embodiment of an expansion joint constructed in accordance with the present invention, showing how corner panels can be accommodated by a corner panel expansion shield.
Figure 9:
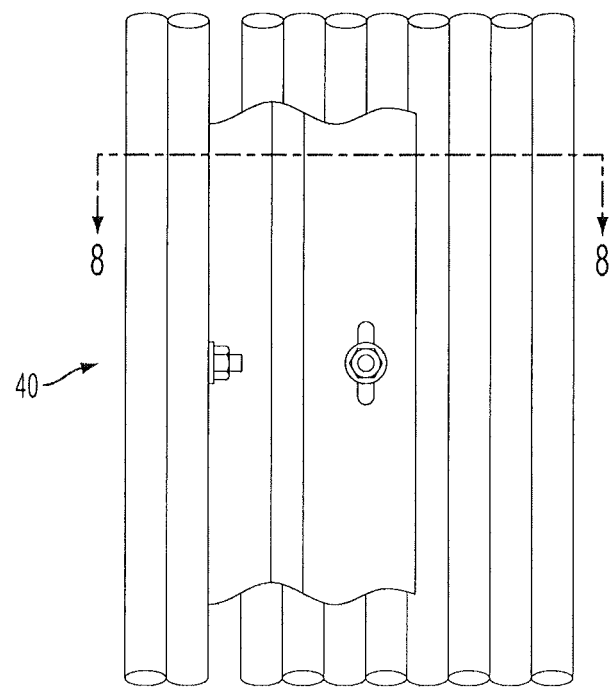
FIG. 9 is an interior elevation view of the expansion joint of FIG. 8, showing the expansion joint attached to corner panels of a boiler.

FIGS. 8-9 show cross-sectional and interior elevation views, respectively, of a fourth exemplary embodiment showing a corner expansion shield 40 in accordance with the invention. Corner expansion shield 40 operates much the same as corner expansion shield 20 described above, with a different cross-sectional shape that keeps the bend of the shield more to the interior of the boiler. Those skilled in the art will readily appreciate that any suitable cross-sectional shape can be used without departing from the spirit and scope of the invention.

Figure 10:
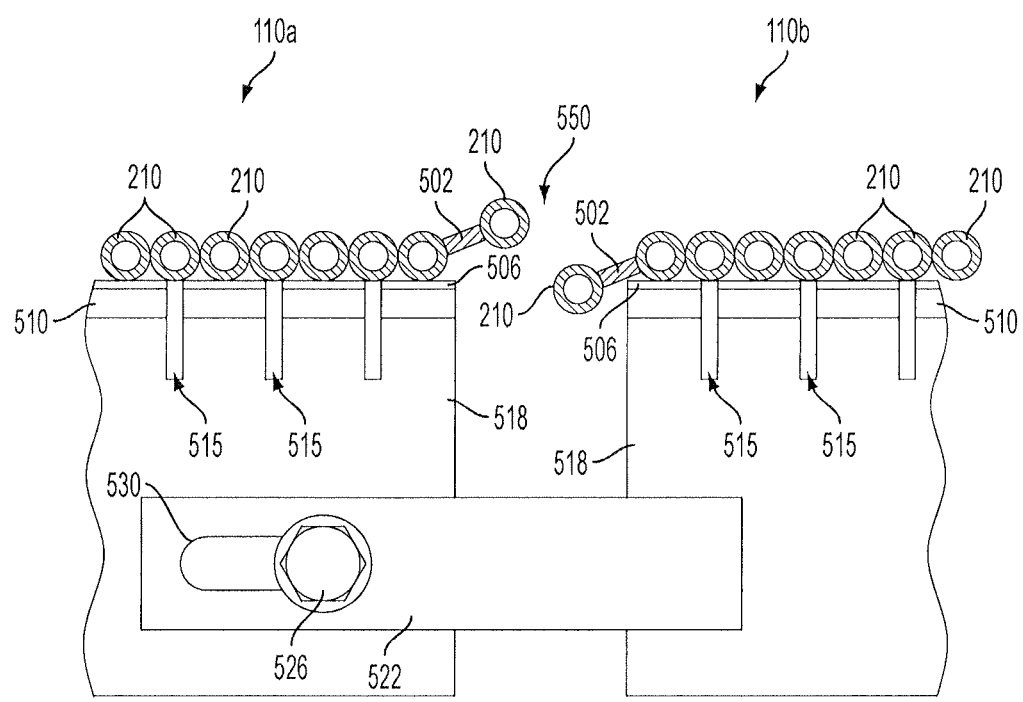
FIG. 10 is a partial cross-sectional view of a fifth exemplary embodiment of an expansion joint constructed in accordance with the present invention.
Figure 11A:
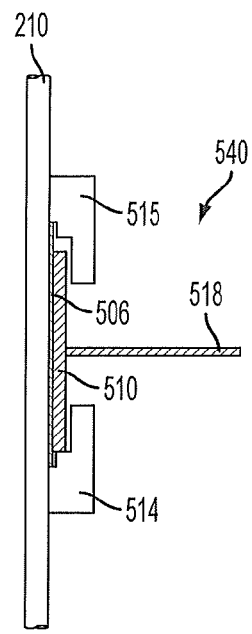
FIGS. 11(a) and 11(b) show how the fifth exemplary embodiment utilizes a T-bar assembly, where
Figure 11B:
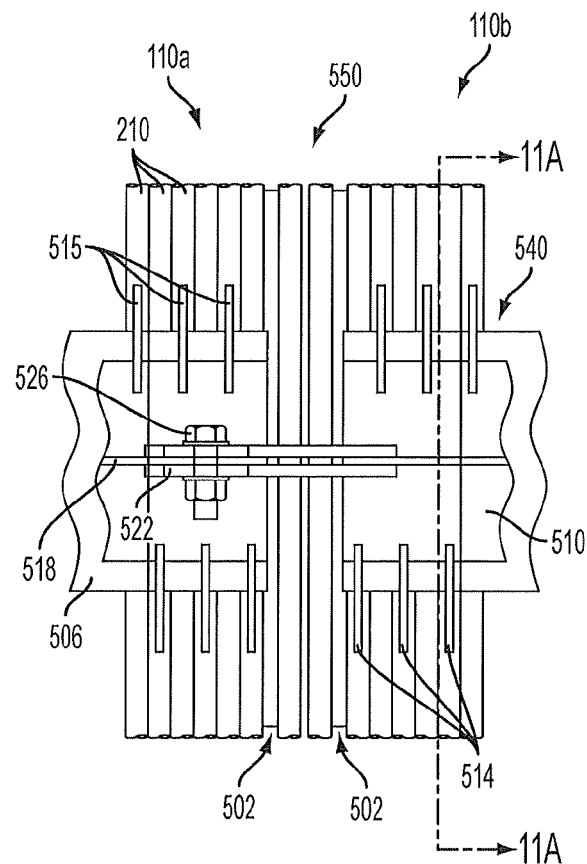

FIGS. 10, 11(a) and 11(b) show a fifth exemplary embodiment of the present invention. Panels 110a and 110b are arranged in-line and parallel to one another with a gap 550 between the panels. Lower tube clips 514 are welded to boiler tubes 210, as shown in FIG. 11(a). A stainless steel plate 506 is inserted into lower tube clips 514, resting on its lower edge. Each panel 110a and 110b has an individual stainless steel plate 506 which runs the width of each panel, i.e., substantially perpendicular to the tubes. A back steel support plate 510 is inserted behind stainless steel plate 506 into lower tube clips 514. Similar to the stainless steel plate 506, back support steel plate 510 rests on the lower tube clips 514 and runs the width of each panel 110a and 110b. Upper tube clips 515 are then welded to tubes 210, holding stainless steel plate 506 and back support steel plate 510 in place. Stainless steel plate 506 serves to protect the support assembly 540 from penetrating solar radiation. T-bar 518 is then welded perpendicular to back steel support 510 to create a rigid strong back. Assembly 540 serves to hold each boiler tube 210 from bowing outward. Connecting plate 522 connects adjoining T-bars 518. Bolt 526 secures connecting plate 522 to adjoining T-bars 518. Connecting slot 530 allows bolt 526 to move horizontally, which allows panels 110a and 110b to expand towards each other freely. At panel gap 550 two boiler tubes 210 are held out-of-plane by membrane 502. The out-of-plane tubes 210 serve to protect the panel gap 550 from penetrating solar radiation. As the boiler 100 heats up during operation, panels 110a and 110b grow together to close gap 550.

Figure 12:
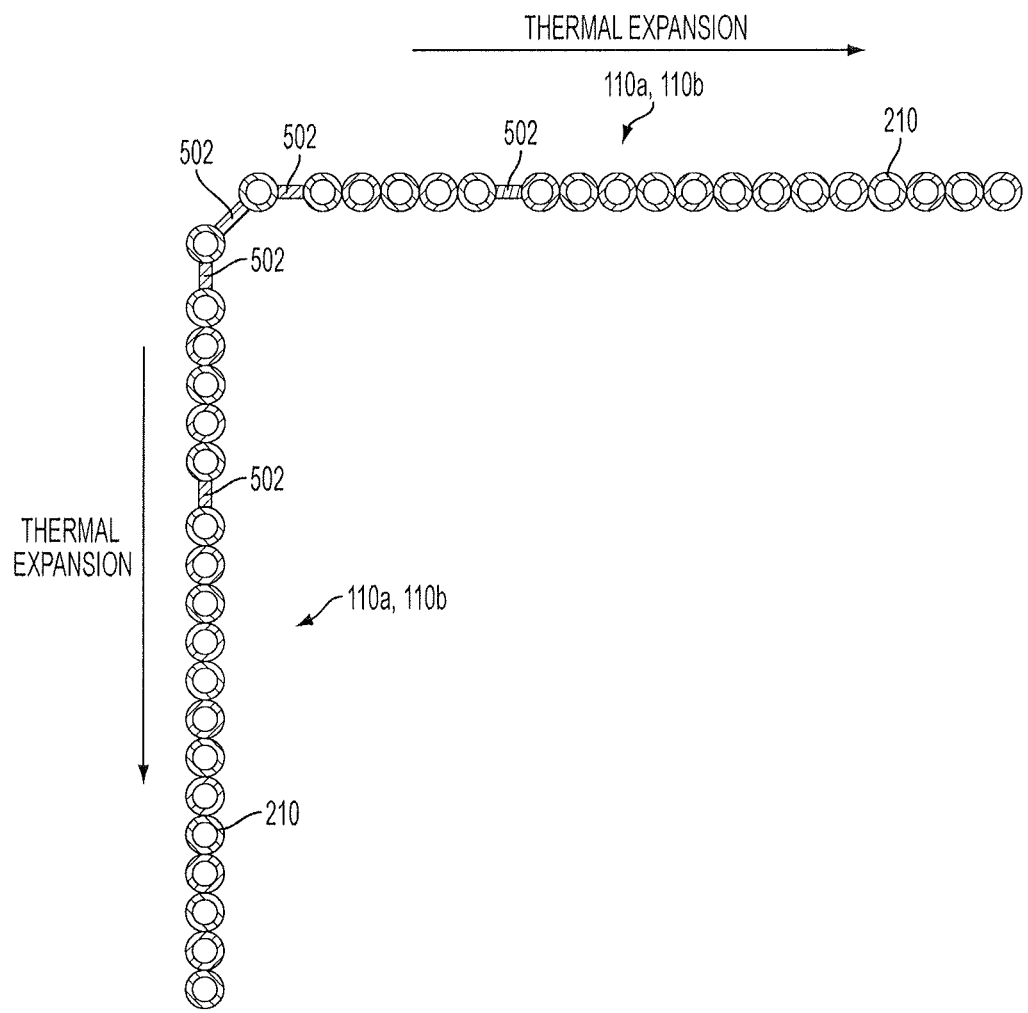
FIG. 12 is an isolated top cross-sectional view of a corner assembly of the fifth exemplary embodiment.

While the gaps in-between the panels 110a, 110b are sealed with out of plane tubes 210 to allow for expansion, the corners are rigidly connected together, as shown in FIG. 12, because the corner panels expand away from the corner, as indicated by arrows in FIG. 12. This is because all of the thermal expansion is away from the corners of the boiler 100. To create the seal in the corners the last tubes 210 of the perpendicular corner panels 110a, 110b switch from tangent to membrane connectors. A single piece of membrane 502 is then welded at a 45 degree angle with respect to the panels 110a, 110b, to each of the two tubes 210 that form the corner of the boiler 100. This creates a solid and sealed corner formed of tubes 210 and membrane 502 which does not allow any radiation to penetrate the boiler.

The methods and systems of the present invention, as described above and shown in the drawings provide for expansion joints between panels in solar boilers. This configuration provides improved accommodation of thermal expansion in the vertical and lateral directions of the panels while also providing protection of components and spaces internal to the receiver panels from leakage of solar radiation from the heliostats.

While the apparatus and methods of the subject invention have been shown and described with reference to preferred embodiments, those skilled in the art will readily appreciate that changes and/or modifications may be made thereto without departing from the spirit and scope of the invention.

What is claimed is:

1. A boiler for a solar receiver comprising:
 a) a first receiver panel having a plurality of substantially parallel boiler tubes fluidly connecting an inlet header of the panel to an outlet header of the panel;
 b) a second receiver panel having a plurality of substantially parallel boiler tubes fluidly connecting an inlet header of the panel to an outlet header of the panel, wherein the boiler tubes of the second receiver panel are substantially parallel to the boiler tubes of the first receiver panel, and wherein the first and second receiver panels are separated by a gap between the boiler tubes;
 c) a panel expansion joint connected to the first and second receiver panels across the gap, wherein the panel expansion joint is configured and adapted to allow for lengthwise thermal expansion and contraction of the receiver panels along the boiler tubes, and to allow for lateral thermal expansion and contraction of the receiver panels toward and away from one another, while blocking solar radiation through the gap, wherein the panel expansion joint includes a flexible panel expansion shield between the tubes of the first and second receiver panels configured to block solar radiation through the gap and to flex to allow for lateral thermal expansion and contraction of the receiver panels toward and away from one another, wherein the panel expansion shield defines elongated slots passing through the panel expansion shield, and is attached to the first and second receiver panels by fasteners passing through the elongated slots to accommodate panel thermal expansion and compression along the slots.

2. A boiler for a solar receiver as recited in claim 1, wherein the first and second receiver panels are substantially coplanar.

3. A boiler for a solar receiver as recited in claim 1, wherein the first and second receiver panels are substantially perpendicular.

4. A boiler for a solar receiver as recited in claim 1, wherein a cross-section of the flexible panel expansion shield includes a first portion and a second portion, and a bend between the first and second portions at an angle with respect to first and second portions, wherein the first portion is directly affixed to the tubes of the first receiver panel and the second portion is directly affixed to the tubes of the second receiver panel, wherein the first and second portions are substantially coplanar with one another, and wherein the bend is configured to allow for lateral thermal expansion and contraction of the receiver panels toward and away from one another.

5. A boiler for a solar receiver as recited in claim 1, wherein a cross-section of the flexible panel expansion shield includes a first portion and a second portion, and a bend between the first and second portions at an angle with respect to first and second portions, wherein the first and second portions are substantially normal to one another, and wherein the bend is configured to block radiation leakage at corners of the boiler.

6. A boiler for a solar receiver comprising:
 a) a first receiver panel having a plurality of substantially parallel boiler tubes fluidly connecting an inlet header of the panel to an outlet header of the panel;
 b) a second receiver panel having a plurality of substantially parallel boiler tubes fluidly connecting an inlet header of the panel to an outlet header of the panel, wherein the boiler tubes of the second receiver panel are substantially parallel to the boiler tubes of the first receiver panel, and wherein the first and second receiver panels are separated by a gap;
 c) a panel expansion joint connected to the first and second receiver panels across the gap, wherein the panel expansion joint is configured and adapted to allow for lengthwise thermal expansion and contraction of the receiver panels along the boiler tubes, and to allow for lateral thermal expansion and contraction of the receiver panels toward and away from one another, while blocking solar radiation through the gap, wherein the panel expansion joint includes a flexible panel expansion shield configured to block solar radiation through the gap and to flex to allow for lateral thermal expansion and contraction of the receiver panels toward and away from one another, wherein the panel expansion shield defines elongated slots passing through the panel expansion shield and is attached to the first and second receiver panels by fasteners passing through the elongated slots to accommodate panel thermal expansion and compression along the slots.

7. A boiler for a solar receiver as recited in claim 6, wherein the first and second receiver panels are substantially coplanar.

8. A boiler for a solar receiver as recited in claim 6, wherein the first and second receiver panels are substantially perpendicular.

9. A boiler for a solar receiver as recited in claim 6, wherein a cross-section of the flexible panel expansion shield includes a first portion and a second portion, and a bend between the first and second portions at an angle with respect to first and second portions, wherein the first portion is directly affixed to the tubes of the first receiver panel and the second portion is directly affixed to the tubes of the second receiver panel, wherein the first and second portions are substantially coplanar with one another, and wherein the bend is configured to allow for lateral thermal expansion and contraction of the receiver panels toward and away from one another.

10. A boiler for a solar receiver as recited in claim 6, wherein a cross-section of the flexible panel expansion shield includes a first portion and a second portion, and a bend between the first and second portions at an angle with respect to first and second portions, wherein the first and second portions are substantially normal to one another, and wherein the bend is configured to block radiation leakage at corners of the boiler.

* * * * *